(12) United States Patent
Xun et al.

(10) Patent No.: US 7,207,193 B2
(45) Date of Patent: Apr. 24, 2007

(54) METHOD OF FABRICATING LOW-WARP FLAT GLASS

(75) Inventors: May Xun, Elmira, NY (US); Gautam Meda, Corning, NY (US)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 10/730,175

(22) Filed: Dec. 8, 2003

(65) Prior Publication Data

US 2005/0120748 A1 Jun. 9, 2005

(51) Int. Cl.
*C03B 17/06* (2006.01)
*C03B 25/00* (2006.01)

(52) U.S. Cl. .............................. 65/95; 65/115; 65/117; 65/118

(58) Field of Classification Search .................... 65/95, 65/114, 115, 117, 118, 121, 122, 125, 128, 65/194, 204, 348, 352, 354, 29.19, 83–85, 65/187, 325
See application file for complete search history.

(56) References Cited

U.S. PATENT DOCUMENTS

| | | | | |
|---|---|---|---|---|
| 3,149,949 A | * | 9/1964 | Dockerty et al. | 65/53 |
| 3,301,650 A | * | 1/1967 | Ward | 65/95 |
| 3,536,463 A | * | 10/1970 | Michalik et al. | 65/95 |
| 3,607,183 A | * | 9/1971 | Flori | 65/83 |
| 3,914,118 A | * | 10/1975 | Brooke et al. | 65/95 |
| 4,913,720 A | * | 4/1990 | Gardon et al. | 65/114 |
| 5,837,026 A | * | 11/1998 | Sugawara et al. | 65/66 |
| 5,916,656 A | * | 6/1999 | Kitayama et al. | 428/64.1 |
| 6,772,610 B1 | * | 8/2004 | Albrand et al. | 65/162 |
| 2002/0038558 A1 | * | 4/2002 | Nakata et al. | 65/29.19 |
| 2003/0233846 A1 | * | 12/2003 | Boaz | 65/114 |

FOREIGN PATENT DOCUMENTS

JP     10-053426     2/1998

OTHER PUBLICATIONS

Malhammer, AKe, Coooling Efficiency Concept, retrieved from http://www.coolingzone.com/Guest/News/NL_NOV_2001/Ake/Nov_Ake_2001.html on Sep. 7, 2005.*

* cited by examiner

*Primary Examiner*—Carlos Lopez
(74) *Attorney, Agent, or Firm*—Kevin M. Able; Bruce P. Watson; William S. Francos

(57) ABSTRACT

A method of fabricating a glass sheet comprises modifying the thermal stress in the glass such that it is a tensile stress or substantially zero stress in a particular temperature zone of the glass, with that zone selected such that the glass sheet is formed substantially free of warping. In an example embodiment, the modifying of the thermal stress is effected by non-uniform cooling of the glass across the glass transition temperature range. This non-uniform cooling may be applied in cooling segments that are linear and at least two of the segments have differing slope.

20 Claims, 2 Drawing Sheets

METHOD OF FABRICATING LOW-WARP FLAT GLASS

BACKGROUND

Display devices are used in a variety of applications. For example, thin film transistor liquid crystal displays (TFT-LCD) are used in notebook computers, flat panel desktop monitors, LCD televisions, and Internet and communication devices, to name only a few. Some display devices such as TFT-LCD panels and organic light-emitting diode (OLED) panels are made out of flat glass sheets. With many display devices, the glass used in the panels must be flat to within approximately 150 and approximately 250 micrometers over the surface of the glass. Any warping or ripple in the glass will have deleterious effects on the display quality.

For purposes of illustration, in many display devices, such as those referenced above, it is useful to incorporate electronic components onto the glass substrate used in the display device. Often, the electronic components are complementary metal oxide semiconductor (CMOS) devices including TFT's. In these applications, it is beneficial to form the semiconductor structure directly on the glass material of the display.

Thus, many LCD displays often comprise a glass substrate with the transistors formed over the glass substrate, and beneath a layer of LC material. The transistors are arranged in a patterned array, and are driven by peripheral circuitry to provide to switch on desired voltages to orient the molecules of the LC material in the desired manner. The transistors are essential components of the picture elements (pixels) of the display.

As can be readily appreciated, any variation in the flatness of the glass panel may result in a variation of the spacing of the transistors and the pixels. This can result in distortion in the display panel. As such, in LCD and other glass display applications, it is exceedingly beneficial to provide glass substrates that are within acceptable tolerances for flatness to avoid at least the problems of warped glass discussed above.

Known methods of fabricating glass panels with acceptable levels of warp or non-flatness require empirically adjusting the glass cooling rate. However, this is clearly an iterative process and results in unacceptable yields and ultimately unacceptable cost in the final product.

What is needed therefore is a method of forming substantially flat glass that overcomes at least the drawbacks referred to above.

SUMMARY

In accordance with an example embodiment, a method of fabricating a glass sheet comprises modifying the thermal stress in the glass such that it is a tensile stress or substantially zero over a particular temperature zone, with that zone selected so the glass sheet is substantially free of warping.

In accordance with another example embodiment, a method of fabricating glass sheets includes iteratively providing a plurality of substantially non-linear cooling sequences over a glass transition temperature range to obtain stress data of a glass sample. The method also includes selecting one of the plurality of substantially non-linear cooling sequences, which results in substantially no compression stress in the glass sample, or results in tension stress in the glass sample.

In accordance with another example embodiment, a method of fabricating glass sheets having substantially no curtain warp includes cooling the glass non-linearly relative to its distance from a root.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known devices, methods and materials may be omitted so as to not obscure the description of the present invention.

A method of fabricating a glass material includes modifying the thermal stress such that the thermal stress is a tensile stress, or substantially zero in a specific region, so that the resulting glass sheet is substantially free of warping.

Beneficially, the tensile stress substantially eliminates the internal stress that results in warping in the glass that can be deleterious in various applications of the glass. One such type of warp is curtain warp, which is a term of art used to describe a ripple in the glass that resembles a curtain.

In accordance with example embodiments described herein, over the glass transition region temperature range the cooling versus distance from the root is substantially non-linear in order to substantially cancel internal compression stress that creates the warped glass. The non-linear cooling over this segment may be comprised of a plurality of cooling segments. Each segment may be substantially linear, but does not have to be completely linear. To wit, one or more of these segments may be non-linear. Ultimately, the slope and duration of these cooling segments are chosen to reduce or substantially eliminate compression stress. These and other useful aspects are described in further detail as the present description continues.

Illustratively, the glass of the example embodiments is flat glass having a thickness on the order of approximately 0.1 to 2.0 mm. The glass beneficially has a flatness across the substrate on the order of approximately 150 µm to approximately 250 µm, depending the size of the substrate. The glass may be used in glass displays such as those referenced above, or in other applications where flat, substantially ripple-free glass is beneficial. For example, the glass may be Corning Eagle 2000™ or Corning 1737™ may benefit from the example embodiments. Glass materials used in other applications in which it is useful to have a substantially ripple-free surface may benefit from the example embodiments. Moreover, it is noted that the methods of the example embodiments may be applied to other facets of glass fabrication.

Figure 1:
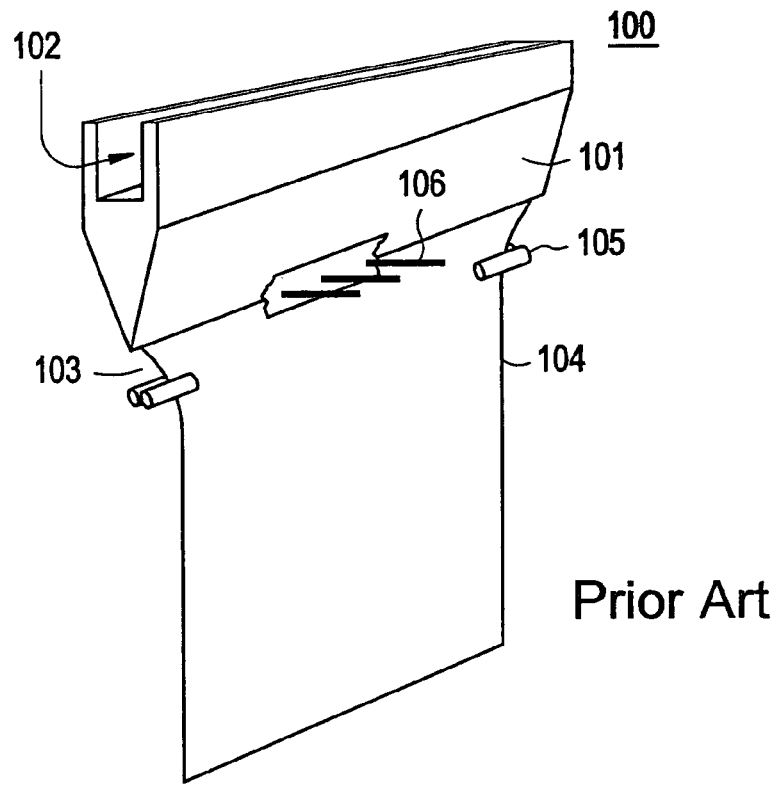
FIG. 1 is a schematic view of a fusion glass fabrication apparatus in accordance with an example embodiment.

FIG. 1 shows a schematic diagram of a glass fabrication apparatus 100 in accordance with an example embodiment. The apparatus 100 is known in the art of fusion glass fabrication. The apparatus includes an isopipe 101, which receives fluid glass (not shown) in a cavity 102. The root is shown at 103, and the sheet of glass 104 traverses edge rollers 105. The root 103 of the isopipe 101 refers to the location where molten glass from both outer sides of isopipe 101 join and flow freely. Finally, the doctari 106 are as shown. As the apparatus is known, details are omitted so as to not obscure the description of the example embodiments. It is noted, however, that other types of glass fabrication apparati may be used in conjunction with example embodiments. These apparati are within the purview of the artisan of ordinary skill in glass manufacture.

Figure 2:
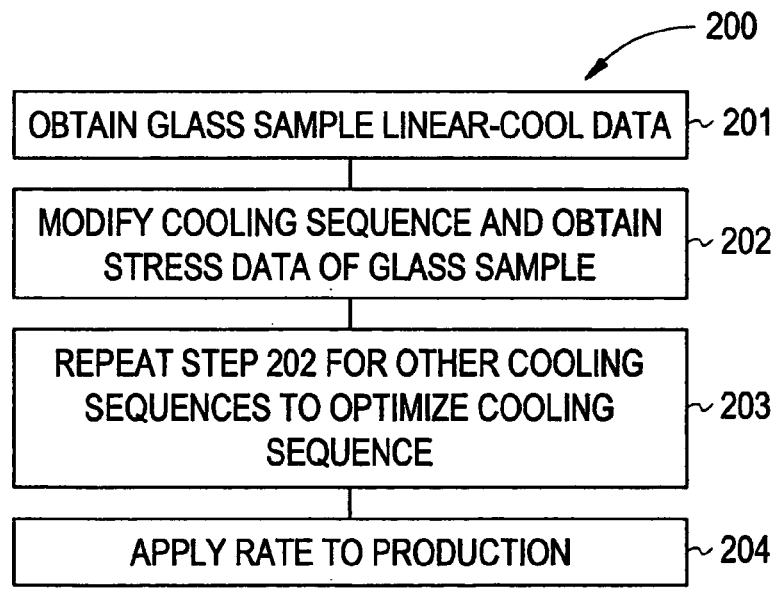
FIG. 2 is a flow diagram of a process of fabricating substantially flat fusion glass in accordance with an example embodiment.

FIG. 2 is a flow chart of an illustrative method 200 in accordance with an example embodiment. The example embodiment of FIG. 2 is applied to the fabrication of substantially flat glass panels using a fabrication apparatus such as described in connection with FIG. 1.

At step 201, the uniform or linear cooling data of a particular glass sample formed into sheet glass is obtained by computer-based mathematical modeling. The computer modeling may be effected using one or more of a variety of well-known mathematical modeling techniques. As these are known, details are omitted so as to not obscure the description of example embodiments. These cooling data includes the stress (normally in p.s.i.) for the glass sample as it cools during fabrication. For example, these data may be the stress versus temperature and time (or distance from the root) when the glass cools from its molten state upon emerging from the isopipe to its final state at room temperature.

As will become clearer as the present description continues, uniform or linear cooling of the glass results in curtain warping due to compression of the glass in the glass transition temperature region over which the glass transforms from a fluid to a glass-like material. This glass transition temperature region occurs in many glasses over temperature ranges between approximately 850° C. and approximately 650° C. For example, this uniform cooling could be the cooling of the glass to an ambient temperature as it traverses the fabrication assembly. The compression stress (negative stress) in the glass transition region results from nonlinear thermal expansion in the glass material as it cools uniformly through the glass transition temperature. In the glass transition temperature region, the coefficient of thermal expansion varies non-linearly with a linear change in the temperature. Accordingly, the expansion of the glass with temperature is also non-linear, and thus not uniform. If unchecked, this will result in a compression in the glass, which will cause curtain warping or other warping affects in the glass.

Upon obtaining the linear or uniform cooling versus stress data of the glass at step 201, the method includes modifying the cooling sequence, particularly through the glass transition temperature region at step 202. One objective of step 202 of the present embodiment is to optimize the glass stress so that over the glass transition temperature region, the glass has either substantially zero stress or a positive stress, or tension. At the end of the glass transition temperature region, the glass will be substantially flat because of the positive thermal stress induced by varying the cooling rate selectively over the region, thereby reducing the likelihood of the deleterious curtain warping. It is noted that the control of the cooling rate may be effected by heating/cooling with an external heating/cooling devices to enable cooling at a rate that is slower/faster than that realized using unaided radiation of heat and convection. Such heating/cooling devices within the purview of one of ordinary skill in the art of glass sheet manufacture may be used to realize this controlled cooling rate.

It is noted that the modification of the cooling sequence from the linear cooling sequence of step 201 beneficially optimizes the cooling of the glass in the glass transition region to substantially eliminate the compression and thus the curtain warping that can result. However, as alluded to above, the elimination of the compression in the glass can be effected by various cooling sequences. Some of these sequences will result in the glass have a net positive stress at the end of the glass transition region, and other sequences will result in the glass having substantially no stress at the end of the glass transition region.

In an exemplary embodiment, in order to substantially eliminate curtain warp the glass is cooled at a relatively high rate at temperatures above the glass transition region, illustratively in a range of approximately 6° C./in. to approximately 15° C./in. This region is approximately 10 inches to 15 inches from the root. It is noted that the cooling rate in this region and other regions after the root are controlled by adjusting heating/cooling power to the glass surface.

Next, at the upper portion of the glass transition region, the rate of cooling is reduced to in the range of approximately 4° C./in. to approximately 10° C./in. This slower cooling rate is continued for the next approximately 10 inches and approximately 15 inches.

As will become clearer as the present description continues, each of the cooling regions of the exemplary embodiments has a substantially constant slope on a temperature versus distance curve. The rate of change of the cooling (with respect to distance) is decided based on the stress curve determined from a linear cooling (temperature) simulation. To wit, when the temperature is reached that corresponds to a peak (relative maximum) internal compression stress, a change in the rate of cooling is required. In practice, this may be implemented at a position from the root or when the glass reaches this temperature during the cooling process.

For the next 15–25 inches, the rate of cooling is changed at the lower end of the glass transition region to a cooling rate in the range of approximately 2° C./in. to approximately 5° C./in. After the glass has traversed the glass transition region, the cooling rate is maintained at a constant level, thereby creating a near-linear temperature profile.

It is noted that the slowing of the cooling rate at the beginning of the glass transition region enables the glass molecules to rearrange in structure thereby reaching a reduced energy state, and less compaction or compression. The further reduction in the cooling rate at the lower end of the glass transition region creates a tensile stress band in the horizontal width of the glass sheet. The tensile stress band is created within the zone where there is a reduction in slope of the cooling curve. Such tension in the glass is useful to foster a stretching of the glass as the glass transforms from a glassy material/semi-liquid state to its solid state. This is exceedingly beneficial in preventing warping of the glass due to compression.

Finally, the control of the cooling rate below the glass transition region is less rigorous, because it does not strongly affect the stress in the warp-prone glass transition region. Stated differently, the stress in the glass does not change significantly during the cooling to room temperature from the end of the glass transition region. However, it is noted that the cooling rate below the glass transition region should be controlled to create a curve that is substantially free from sudden changes in the slope (i.e., a smooth temperature curve) in order to minimize the development of a temporary bow in the glass, which may propagate to the glass still within the glass transition zone, causing additional shape defects in the glass sheet.

In the example embodiment described above, the cooling rates across the glass transition region are a series of two or more controlled cooling segments, where each segment provides linear cooling at a particular rate, and between each linear cooling segment begins with a nearly instantaneous transition in the cooling rate. However, it noted that this is merely an illustrative embodiment, and other embodiments may be used to realize the elimination of the compression of the glass in the glass transition region. For example, it is noted that linear cooling rates other than those referenced above may be used to effect the desired elimination of compression. Moreover, depending on the glass material used, other linear cooling rates may be required in order to meet this desired end. Furthermore, it is noted that additional cooling segments may be used to meet this desired end. Again, depending on the glass material used, additional cooling segments may be required. Finally, it is noted that the cooling sequence across the glass transition does not necessarily need to be a plurality of linear cooling segments. Rather, one or more non-linear cooling segments may be chosen, with the slope of the cooling rate varying to effect the desired reduction in compression, or the creation of tension during cooling, or both.

Step 203 of the illustrative method of FIG. 2 is an optional step, and includes repeating the modifying of the cooling sequence by selecting different cooling rates across the glass transition region. This may be done as desired to optimize the cooling sequence to achieve a particular resultant stress level or a lower curtain warp.

Step 204 of the process is the implementation of the chosen cooling sequence into the production process. The exemplary methods of fabricating the glass described above foster a significant reduction in the complexity of manufacturing glass with reduced curtain warp. As can be appreciated, these methods are carried out using modeling techniques in order to determine the optimal cooling sequences; and not using trial-and-error that known techniques employ. As such, a significant reduction in the down time and waste is realized by the example embodiments. To this end, by virtue of the example embodiments, new glass materials, or warp requirements, or both, can be effected in production rather quickly by the selection of the desired cooling sequences, rather than the inefficient and costly trial-and-error techniques of the known cooling techniques. These and other benefits of the example embodiments will be apparent to one skilled in the glass processing arts.

Figure 3:
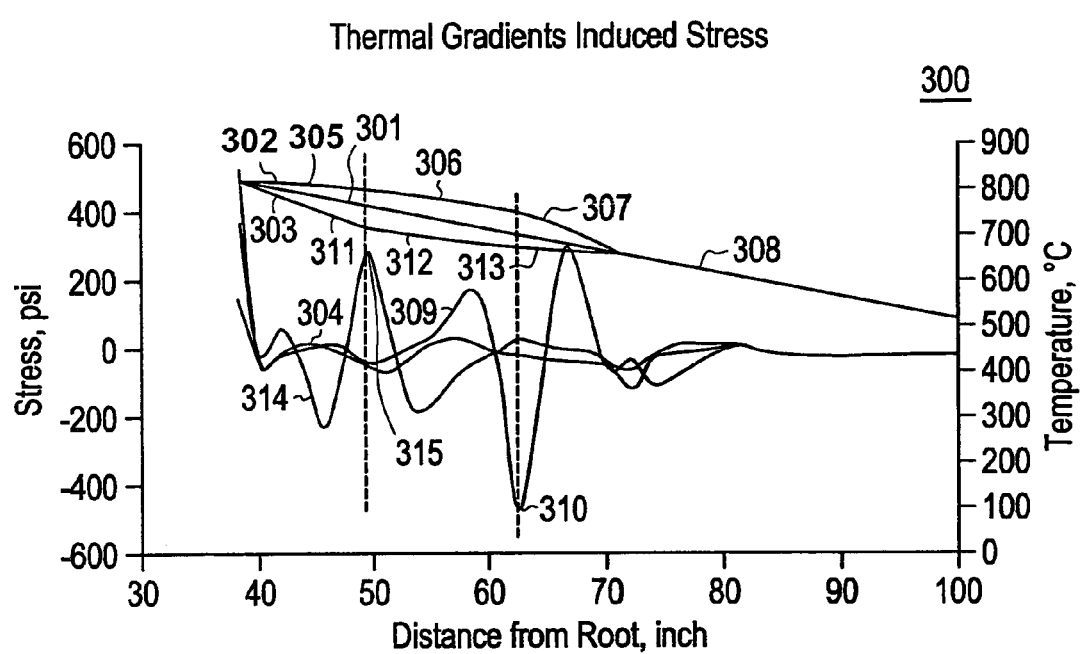
FIG. 3 is a graphical representation of the stress of glass subjected to various cooling rates, with the graphical representation being used to optimize the glass thermal stress in accordance with an example embodiment.

FIG. 3 is a graph 300 of the stress and temperature versus distance from the root of the isopipe in accordance with an illustrative embodiment. Illustratively, graph 300 is mathematically modeled using a computer model. Alternatively, the graph may be of the time from the root versus temperature. It is noted that graph 300 may be used to perform the selection of the optimal cooling method described in conjunction with the exemplary embodiments of FIG. 2. To wit, of the three modeled cooling sequences (cooling curves 301, 302, 303), one may be chosen to optimize flatness in the glass sheet made of the chosen glass material.

The glass sample is illustratively a glass material that is formed into a glass sheet for use as a glass display of the type reference above. The graph 300 includes three separate modeled cooling sequences for a particular glass material that is being formed by known fusion techniques. The cooling sequences of FIG. 3 are in the glass transition region of the particular glass being processed, illustratively from approximately 850° C. to approximately 650° C. The first sequence shown as first curve 301 is substantially linear. The second sequence, a non-linear curve, is shown as second curve 302 and has a reduced initial cooling rate compared to the first curve. A third sequence is shown as curve 303 and has an increased initial cooling rate compared to the first curve 301.

The first curve 301 produces a stress curve 304 shown in FIG. 3. The glass manufactured using this cooling sequence has some positive (tension) stress, but has a significant amount of compression stress. The glass sheet in this example is subject to an unacceptable amount of compression. Accordingly, the modeling method of the example embodiments allows the elimination of this cooling sequence without having to actually perform the cooling of a sample. In keeping with the benefits of the embodiment described previously, this reduces waste and improves yield in manufacture.

The second curve 302 has three segments of cooling. A first segment 305 and a second segment 306, and a third segment 307. In the present embodiment, the first segment 305 and the second segment 306 have substantially the same slope, and cooling curve of the third segment has a slope that differs from that of segments 305 and 306. The cooling segments result in stress in the glass represented by curve 309. The final segment 308 is also linear and is equal in slope to the final segment of curves 301 and 303.

The initial cooling rate of the second curve 302, cooling segment 305, is reduced compared to that of the slope of curve 301. This results in some tension initially, as shown in the stress curve 309. However, the second segment 307, which has a relatively steep slope compared to the first segment 305, results in significant compression in the glass. This is manifest as a stress peak 310. As such, the second sequence represented by the second curve is also not useful as the glass will have curtain warp that is at unacceptable levels. Again, the modeling method of the example embodiments allows the elimination of this cooling sequence without having to actually perform the cooling of a sample. In keeping with the benefits of the embodiment described previously, this reduces waste and improves yield in manufacture.

The third cooling sequence, represented by curve 303, also has three cooling segments, namely a first segment 311, a second segment 312, and a third segment 313. It is noted that this cooling sequence is similar to the cooling sequence described in connection with and example embodiment of FIG. 2 above. This third cooling sequence results in stress in the glass shown in stress curve 314. In this examplary embodiment, the first segment 311 has a comparatively increased slope compared to curve 301, as well as to the other segments, 312 and 313. The first cooling segment 311 results in some compression as shown. The second and third cooling segments 312 and 313, respectively, have a comparatively reduced slope to that of the first segment 311, and to the slope of the curve 301. This second cooling segment 312 results in a rather pronounced upward and positive stress peak 315. This cooling profile allows us to compensate for the effects of the non-linear coefficient of thermal expansion in the glass transition region, thus yielding the desired tensile thermal stress as the glass traverses the glass transition region.

As can be appreciated from graph 300, a variety of stress curves can be generated by the selective alteration of the slopes of the cooling segments. Moreover, the lengths can be altered as well. Each of these groups of cooling segments results in a substantially unique stress curve for the particular glass material being processed. As such, a variety of resultant stress values can be realized. For example, a family of curves can be determined and are characterized by a faster to slower cooling of the glass in the range of approximately 780° C. to approximately 720° C., which is the glass transition region for the sample of glass of this embodiment. From this family of curves, a particular curve may be chosen to meet the particular desired end-result in the glass sheet.

Quantitatively, in a cooling sequence of an exemplary embodiment described in keeping with third curve 303, in order to substantially eliminate curtain warp a cooling segment (not shown), which is before the first segment 311, has a relatively high cooling rate at temperatures above the glass transition region. Illustratively, this rate is in a range of approximately 6° C./in. to approximately 15° C./in. This occurs in a region that is approximately 10 inches to approximately 15 inches from the root.

Next, at the upper portion of the glass transition region, and along the first segment 311 the rate of cooling is reduced to in the range of approximately 4° C./in. to approximately 10° C./in. This slower cooling rate is continued for the next approximately 10 inches and approximately 15 inches.

In the example, during the second and third cooling segments 312 and 313, the rate of cooling is changed at the lower end of the glass transition region to a cooling rate in the range of approximately 2° C./in. to approximately 5° C./in. This rate of cooling is effected for the next approximately 15 inches to approximately 25 inches. After the glass has traversed the glass transition region, the cooling rate is maintained at a substantially constant level, for example as at segment 308. Accordingly, the exemplary embodiment includes a near-linear temperature profile during the cooling process, which significantly reduces, or substantially eliminates curtain warp caused by compression stress in the glass by providing nullifying tension stress in the glass.

As stated previously, a non-linear cooling profile comprised of linear cooling segments, such as the embodiment most presently described, is merely illustrative of the embodiments. The method may be comprised of more than three cooling segments or fewer than three cooling segments. Moreover, the one or more of the cooling segments may be non-linear. Finally, a combination of linear and non-linear cooling segments may be used to realize the non-linear cooling sequence across the glass transition region temperature range.

The example embodiments having been described in detail in connection through a discussion of exemplary embodiments, it is clear that modifications of the invention will be apparent to one having ordinary skill in the art having had the benefit of the present disclosure. Such modifications and variations are included in the scope of the appended claims.

The invention claimed is:

1. A method of fabricating a glass sheet comprising:
   drawing molten glass from a root of a glass fabricating apparatus to form a glass sheet, wherein a temperature of the glass sheet during the drawing traverses a glass transition temperature range;
   cooling the glass sheet at a first cooling rate between about 6° C./in and 15° C./in while the temperature of the glass sheet is greater than the glass transition temperature range, of the sheet;
   cooling the glass sheet at a second rate between about 4° C./in and 10° C./in while the temperature of the glass sheet is within the glass transition temperature range of the sheet; and
   cooling the glass sheet at a second cooling rate between about 2° C./in and 5° C./in after the second cooling rate and the temperature of the glass sheet is within the glass transition temperature range of the sheet, wherein said cooling rates are defined as the change in temperature per inch traveled by the glass sheet during the draw.

2. The method according to claim 1 further comprising cooling the glass sheet at a substantially constant cooling rate while the temperature of the glass sheet is below the glass transition temperature range.

3. The method according to claim 1 wherein the glass transition temperature range is between about 850° C. and 650° C.

4. The method according to claim 1 wherein the glass transition temperature range is between about 780° C. and 720° C.

5. The method according to claim 1 wherein a transition between the cooling rates is substantially instantaneous.

6. The method according to claim 1 wherein at least one of the first, second and third cooling rates is a nonlinear cooling rate.

7. The method according to claim 1 wherein the glass sheet comprises a tensile stress band across a horizontal width of the glass sheet in the glass transition temperature range.

8. A method of fabricating a glass sheet comprising:
   drawing molten glass from a root of a glass fabricating apparatus to form a glass sheet;
   cooling the glass sheet at a first cooling rate between about 6° C./in and 15° C./in while the temperature of the glass sheet is greater than about 850° C.;
   cooling the glass sheet at a second cooling rate between about 4° C./in and 10° C./in while the temperature of the glass sheet is between about 850° C. and 650° C.; and cooling the glass sheet at a third cooling rate between about 2° C./in and 5° C./in after the second cooling rate and while the temperature of the glass sheet is between about 850° C. and 650° C., wherein said cooling rates are defined as the chance in temperature per inch traveled by the glass sheet during the draw.

9. The method according to claim 8 wherein each of the cooling rates is a linear cooling rate.

10. The method according to claim 8 wherein at least one of the cooling rates is a nonlinear cooling rate.

11. The method according to claim 8 wherein a transition between the cooling rates is substantially instantaneous.

12. The method according to claim 8 wherein the glass sheet comprises a tensile stress band across a horizontal width of the glass sheet while the temperature of the glass sheet is between about 850° C. and 650° C.

13. A method of fabricating a glass sheet comprising:
   drawing molten glass from a root of a glass fabricating apparatus to form a glass sheet;
   cooling the glass sheet at a first cooling rate between about 6° C./in and 15° C./in within a first region of the sheet extending at least about 10 inches to about 15 inches from the root;

cooling the glass sheet at a second cooling rate between about 4° C./in and 10° C./in within a second region of the sheet extending at least about 15 inches below the first region; and cooling the glass sheet at a third cooling rate between about 2° C./in and 5° C./in within a third region of the sheet extending about 15 inches below the second region, wherein said cooling rates are defined as the chance in temperature per inch traveled by the glass sheet during the draw.

14. The method according to claim 13 further comprising cooling the glass sheet in a fourth region of the sheet extending below the third region at a substantially constant rate.

15. The method according to claim 13 wherein each of the cooling rates is a linear cooling rate.

16. The method according to claim 13 wherein at least one of the cooling rates is a nonlinear cooling rate.

17. The method according to claim 13 wherein the glass sheet comprises a tensile stress band across a horizontal width of the glass sheet in the second or third region.

18. The method according to claim 13 wherein the first region extends about 15 inches from the root.

19. The method according to claim 13 wherein the second region extends about 15 inches from the first region.

20. The method according to claim 13 wherein the third region extends about 25 inches from the second region.

* * * * *

UNITED STATES PATENT AND TRADEMARK OFFICE
CERTIFICATE OF CORRECTION

| | | |
|---|---|---|
| PATENT NO. | : 7,207,193 B2 | Page 1 of 1 |
| APPLICATION NO. | : 10/730175 | |
| DATED | : April 24, 2007 | |
| INVENTOR(S) | : Gautam Meda et al. | |

It is certified that error appears in the above-identified patent and that said Letters Patent is hereby corrected as shown below:

Col. 8, Line 9, "second cooling" should be --third cooling--

Signed and Sealed this

Seventh Day of August, 2007

JON W. DUDAS
*Director of the United States Patent and Trademark Office*